United States Patent
Guenther et al.

(10) Patent No.: US 8,688,580 B1
(45) Date of Patent: Apr. 1, 2014

(54) EXPEDITING ELECTRONIC FUNDS TRANSFERS

(75) Inventors: Andreas Guenther, Concord, CA (US); Ryno Blignaut, San Francisco, CA (US); Darryl Weatherspoon, Oakland, CA (US)

(73) Assignee: Xoom Corporation, San Francisco, CA (US)

( * ) Notice: Subject to any disclaimer, the term of this patent is extended or adjusted under 35 U.S.C. 154(b) by 730 days.

(21) Appl. No.: 12/633,565

(22) Filed: Dec. 8, 2009

(51) Int. Cl.
G06Q 40/00 (2012.01)

(52) U.S. Cl.
USPC .................................. 705/44; 705/39; 705/42

(58) Field of Classification Search
USPC ..................................................... 705/39–41
See application file for complete search history.

(56) References Cited

U.S. PATENT DOCUMENTS

| | | | | |
|---|---|---|---|---|
| 7,330,835 B2 * | 2/2008 | Deggendorf | ................... | 705/39 |
| 7,792,716 B2 * | 9/2010 | Gooding et al. | ................ | 705/35 |
| 7,814,017 B2 * | 10/2010 | Vancini et al. | ................... | 705/42 |
| 2002/0016769 A1 * | 2/2002 | Barbara et al. | ................... | 705/40 |
| 2004/0034594 A1 * | 2/2004 | Thomas et al. | ................... | 705/39 |
| 2004/0128240 A1 * | 7/2004 | Yusin | ............................... | 705/39 |
| 2005/0044043 A1 * | 2/2005 | Gooding et al. | ................ | 705/42 |
| 2006/0206427 A1 * | 9/2006 | Love et al. | ...................... | 705/40 |
| 2007/0244830 A1 * | 10/2007 | Hilderman | ...................... | 705/67 |
| 2009/0281946 A1 * | 11/2009 | Davis et al. | ...................... | 705/40 |

* cited by examiner

*Primary Examiner* — Olabode Akintola
*Assistant Examiner* — Abhishek Vyas
(74) *Attorney, Agent, or Firm* — Hickman Palermo Truong Becker Bingham Wong LLP (57) ABSTRACT

In an embodiment, a method comprises initiating a plurality of electronic funds transfer transactions using an automated clearing house (ACH) operator, wherein each of the transactions is associated with one of a plurality of financial institution routing numbers; receiving a negative return code for a particular transaction that is associated with a particular financial institution routing number; in response to receiving the negative return code for the particular transaction and the particular financial institution routing number, and without waiting for an end of a waiting time period specified in one or more financial regulations: marking, as accepted, all other transactions in the plurality that are associated with the same particular financial institution routing number; releasing the marked transactions.

24 Claims, 7 Drawing Sheets

EXPEDITING ELECTRONIC FUNDS TRANSFERS

FIELD OF THE INVENTION

The present invention relates to computers configured to process electronic funds transfers and to techniques for processing Automated Clearing House (ACH) electronic funds transfers.

BACKGROUND

Electronics funds transfer transactions may be used to move money from one account to another over arbitrary distances. Electronic funds transfers are gaining popularity among consumers for sending or receiving money to or from family or friends. However, electronic funds transfers are undesirable for some users because of long delays arising from laws or regulations intended to protect financial institutions. For example, an originator of electronic funds transfers processed through the United States Federal Reserve as Automated Clearing House (ACH) operator normally is required to wait four (4) business days for a paying bank to provide a negative report on a transaction, or for the transaction to clear otherwise, before completing a transfer on the fifth business day after initiation. The waiting period is intended, in part, to provide sufficient time for a payer's financial institution to determine whether the payer's account holds sufficient funds to fund the transfer or to allow the ACH network to determine if funds are collectible from the payer. In many cases, the regulatory waiting period is far longer than actually necessary to process transactions given the computing capabilities of modern financial institutions. Consequently, consumers may become impatient with the required time and perceive the transaction originator to be undesirable.

The PayPal service is known to provide an account linking approach in which PayPal sends two small deposits to a user bank account. The user logs in to the user's online bank account, determines the amounts of the deposits, and reports the amounts to Paypal. In response, PayPal permits the user to link the user's bank account to PayPal. This approach is implemented as a configuration step that the user is required to complete before the user can buy or sell goods or services using the PayPal account.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings.

Arrows in drawings indicate paths for flows of data, and not dependencies of elements.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In one embodiment, a data processing method comprises initiating a plurality of electronic funds transfer transactions using an automated clearing house (ACH) operator, wherein each of the transactions is associated with one of a plurality of financial institution routing numbers; receiving a negative return code for a particular transaction that is associated with a particular financial institution routing number; in response to receiving the negative return code for the particular transaction and the particular financial institution routing number, and without waiting for an end of a waiting time period specified in one or more financial regulations: marking, as accepted, all other transactions in the plurality that are associated with the same particular financial institution routing number; releasing the marked transactions; wherein the marking and releasing are performed by one or more computing devices.

In other embodiments, a computer-readable storage medium stores instructions which when executed cause one or more processors to perform the foregoing operations. Other embodiments may include special-purpose computers that are programmed or feature logic executable to perform the foregoing operations. Still other embodiments are shown and described and will be apparent from the disclosure as a whole.

2. Delayed Expedite for Electronic Funds Transfer Transactions

Figure 1A:
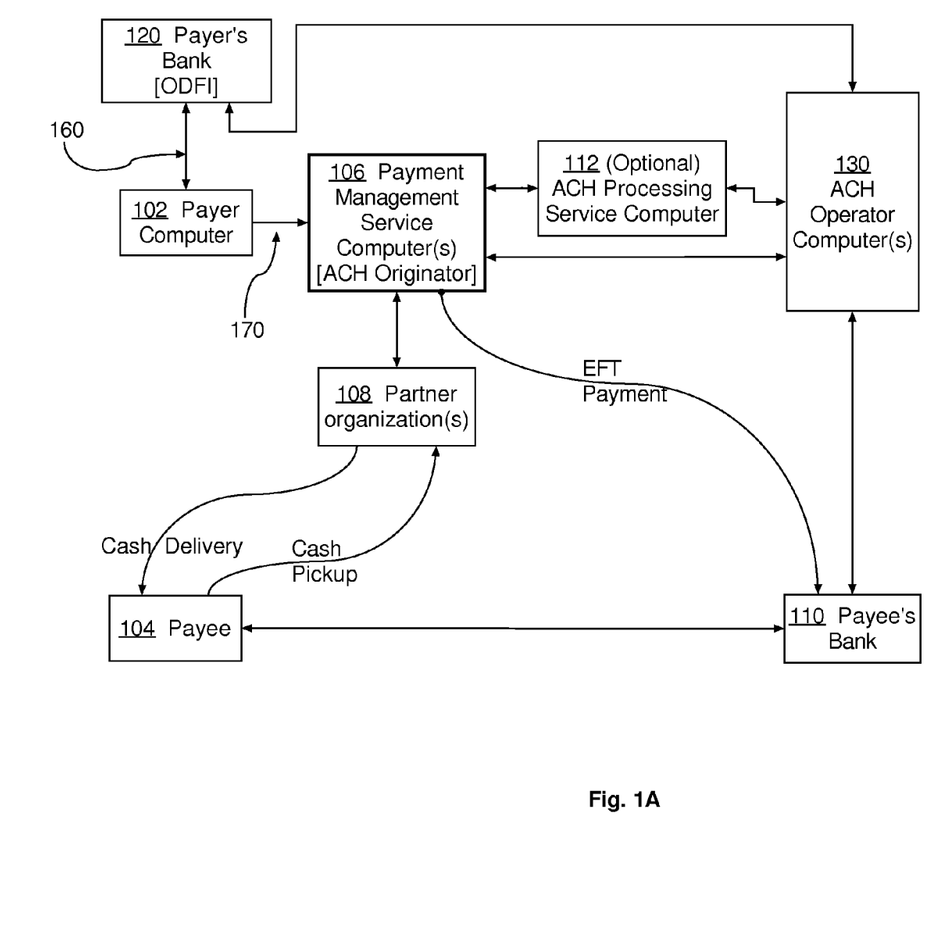
FIG. 1A illustrates a computer system that may be used to implement techniques for expediting electronic funds transfers.
Figure 1B:
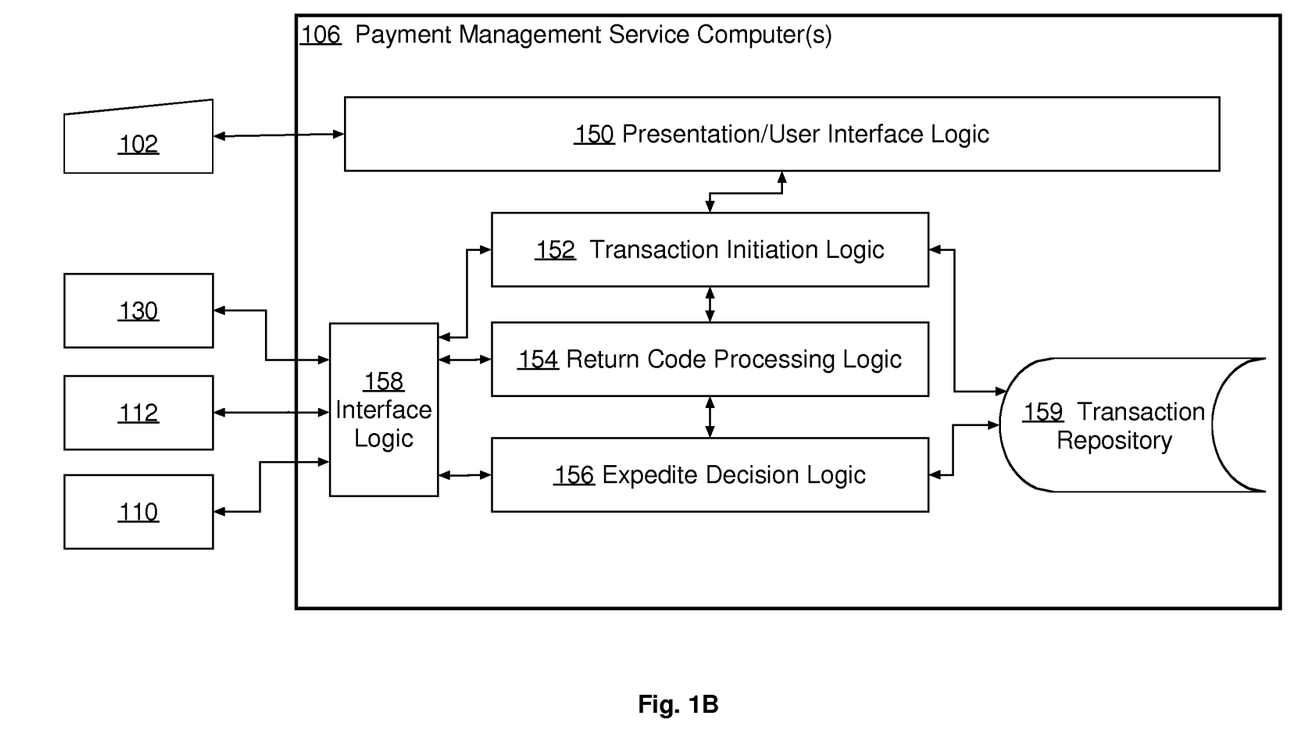
FIG. 1B illustrates example internal logic of the payment management service computer of FIG. 1A.
Figure 2:
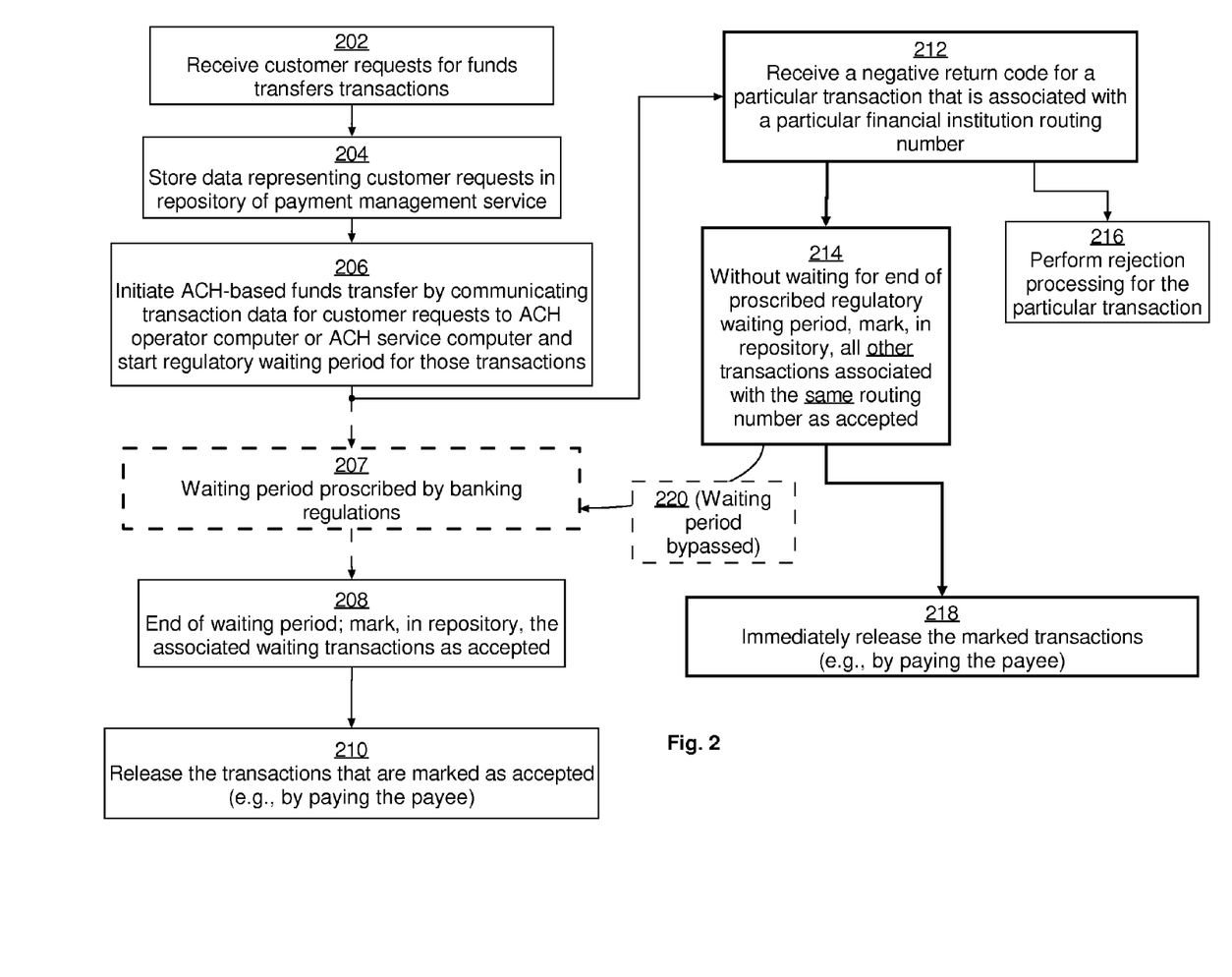
FIG. 2 illustrates a process of expediting electronic funds transfers.

FIG. 1A illustrates a computer system that may be used to implement techniques for expediting electronic funds transfers; FIG. 1B illustrates example internal logic of the payment management service computer of FIG. 1A; FIG. 2 illustrates a process of expediting electronic funds transfers. In an embodiment, the techniques herein are used in the context of a funds transfer transaction in which a payer is sending money to a payee. Each of the payer and payee may be an individual, business, or other entity. The payee may be geographically distant from the payer, for example, in a different country. Thus the transaction may be an international money transfer to a different country and having different currencies associated with the payer's country and the payee's country.

Referring first to FIG. 1A, in an embodiment, a payer computer 102 is communicatively coupled, directly or indirectly through one or more networks, to a payment management service computer 106. Typically payer computer 102 is a laptop, netbook, personal computer or workstation associated with an individual user of a money transfer service hosted on computer 106, and the payment management service computer is a server-class computer or multiple computers in a data center. Computers 102, 106 may be coupled using any of a LAN, WAN, or one or more internetworks, and each arrow shown in FIG. 1A with a straight line may represent a network link using any of a LAN, WAN, or one or more internetworks.

A bank 120, at which the payer has deposited money or has an account, acts as an originating depository financial institution (ODFI). In an embodiment, payment management service computer 106 acts as an automated clearing house (ACH) transaction originator using the techniques that are further described herein. The payment management service computer 106 is coupled to an ACH operator computer 130, which is owned by, operated by or associated with an ACH operator. Example ACH operators include any of a Federal Reserve Bank of the United States, Electronic Payments Network (EPN), a Pan-European Automated Clearing House (PE-ACH), or EBA Clearing Company. Transactions in this disclosure may include domestic FedACH transfers, FedACH International ACH Transactions (IATs), or other forms of transfers using any of the foregoing operators.

For purposes of illustrating a clear example, embodiments are described in terms of interoperation with ACH institutions. However, other embodiments may be implemented in connection with any transaction clearing system that involves delayed transaction processing, or a required or recommended delay period, and provides return codes or other indicator values for transactions that cannot clear, or transactions that specify invalid accounts, or transactions that specify valid accounts holding insufficient funds, or transactions that specify valid accounts that have other defects, errors or problems that affect completion of a transaction. The term "ACH" in this disclosure refers broadly to any transaction clearing system or operator of the kind described in at least this paragraph and the preceding paragraph.

Optionally, payment management service computer 106 is coupled to an ACH processing service computer 112, which is configured to receive transaction information and to originate ACH transactions at the ACH operator computer 130 on behalf of a service, company or entity that owns or operates a payment management service using computer 106. In this arrangement, ACH processing service computer 112 allows the payment management service to handle money transfers without having to interact directly with ACH operator computer 130. Examples of operators of ACH processing service computers 112 include Metapay, Bank of America, and Wells Fargo. For purposes of illustrating a clear example, FIG. 1A shows one ACH processing service computer 112 but in other embodiments the payment management service computer 106 may interoperate with any number of ACH processing service computers 112 of different service providers.

The ACH operator computer 130 is coupled to bank 120. Optionally, ACH operator computer 130 may be coupled to and interoperate with a bank 110 that is associated with a payee 104; this arrangement is used to facilitate an electronic funds transfer of funds held at payer bank 120 to the payee's bank 110, when the payer wishes to electronically transfer funds to the payee 104.

Additionally or alternatively, the payer may wish to provide cash or hard currency to the payee 104. To facilitate a direct payment of cash, the payment management service computer 106 may be coupled to one or more partner organizations 108 that are configured to deliver cash to the payee 104 or to receive a visit from the payee to pick up cash at the partner organization.

Referring now to FIG. 1B, in an embodiment, payment management service computer 106 comprises presentation/user interface logic 150 that is configured to generate a user interface for a payment service for display at client computers such as payer computer 102. For example, presentation/user interface logic 150 may be configured to generate a graphical user interface in the form of static or dynamic HTML pages that are delivered to and rendered by a browser hosted on payer computer 102. Additionally or alternatively, payer computer may host a locally installed client application that interacts with the presentation layer of a server application system hosted at payment management service computer 106.

Payment management service computer 106 further comprises transaction initiation logic 152 coupled to the presentation/user interface logic 150, to return code processing logic 154, to interface logic 158, and to a transaction repository 159. In an embodiment, the transaction initiation logic 152 is configured to receive, from presentation/user interface logic 150, user input representing transaction data, and to initiate or cause initiating one or more electronic funds transfer transactions based on the transaction data, by communicating through interface logic 158 to ACH operator computer 130 or ACH processing service computer 112, as further described below.

The transaction initiation logic 152 is also configured to manage and monitor required regulatory waiting periods for transactions and to release transactions, for payment to payee's bank 110 or for payment through other means, when the waiting periods have expired and/or when other regulatory requirements are satisfied. In an embodiment, transaction initiation logic 152 is configured to store timestamp data in transaction repository 159 when transactions are initiated and to periodically determine when regulatory waiting periods have expired for transactions.

Storing transaction data, writing timestamp data, and determining when regulatory waiting periods have expired may be performed on a batch basis, for example, involving a batch of tens of thousands of transactions for which users entered data on a particular day. For example, the transaction initiation logic 152 might store data and write timestamp data for all transactions initiated on one business day at the end of that day or in an overnight processing cycle, and might review transactions to determine whether regulatory waiting periods have expired at the start of a day or at another time in an overnight processing cycle. Each batch has no particular maximum number of transactions and embodiments herein are applicable to any size batch and computers with any amount of processing capacity. Generally, a batch corresponds to all transactions for a particular business day, but such a one-to-one correspondence is not required and, for example, multiple batches could be formed and submitted for one business day.

The interface logic 158 is configured to transform requests from logical elements 152, 154, 156 into transactions, messages, packets, or frames that conform to protocols used in financial payment networks such as the ACH system.

The transaction initiation logic 152 is further configured to read and write data representing transactions from and to the transaction repository 159, which may comprise a database, file system or other data repository in computer main memory or non-volatile storage such as disk storage. For purposes of illustrating a clear example, transaction repository 159 is shown in FIG. 1B within payment management computer 106, but the transaction repository may be hosted or located in a separate computer, storage area network, network cloud, or data center. Further, for purposes of an example, payment management service computer 106 is illustrated as a single unit but may be implemented using a cluster, node, or farm of multiple computers that are co-located, in a data center, or distributed among multiple locations or data centers.

Return code processing logic 154 is configured to receive, from the ACH network through interface logic 158, return codes relating to in-process transactions, to filter the return codes to identify particular return codes of interest, and to signal or trigger the expedite decision logic 156 when particular return codes of interest are found for particular transactions. The operation of return code processing logic 154 is further described below.

Expedite decision logic 156 is configured to receive signals from return code processing logic 154 indicating particular transactions having particular return codes of interest. The expedite decision logic 156 is further configured to mark certain transactions in repository 159 as approved without waiting for the end of required regulatory waiting periods, in response to receiving signals about particular return codes of interest from the return code processing logic. Particular approaches for expediting are described further below.

Referring now to FIG. 2, in one embodiment, in step 202, customer requests for more funds transfer transactions are received. For example, payment management service computer 106 may interact with a user in the position of a customer of a payment service in the following manner. The payment management service computer 106 receives an HTTP request over an internetwork from payer computer 102 and delivers an HTML form with which a user of the payer computer selects a country to which the user wishes to send money. The user selects a country and submits the form to the payment management service computer 106 using an HTTP POST request. In response, the payment management service computer 106 prompts the user to log in or to establish an account associated with an e-mail address and a password. The user may provide login credentials for authentication, or may submit account details to create a new account with a private password, after which the user is automatically logged in.

Once the user has logged in, payment management service computer 106 generates and provides an HTML form in which the user enters data to identify the payee bank 110 and to identify the recipient of the transferred money. The user submits the completed form to the payment management service computer 106, which may validate data in the form such as bank name, account number, routing number, sort code, address, postal code, telephone, and e-mail address.

If the data validates, then the payment management service computer 106 may generate and provide the user with a form in which the user enters payment information such as bank account details associated with an account at payer bank 120. The payment management service computer 106 may also provide a data confirmation form that prompts the user to review and confirm details of the transaction before the transaction proceeds. The foregoing process may be implemented using presentation/user interface logic 150 in the example embodiment of FIG. 1B, in cooperation with authentication logic and validation logic integrated into the presentation/user interface logic 150 or other elements.

As a result of the foregoing process, payment management service computer 106 receives data describing funds transfer transactions. In step 204, the process stores data representing the transactions in a repository. For example, payment management service computer 106 stores transaction data in transaction repository 159.

In step 206, the process initiates an ACH-based funds transfer by communicating transaction data for customer requests to an ACH operator computer or to an ACH service computer, and starts the regulatory waiting period for those transactions. For example, transaction initiation logic 152 forms a transaction initiation message and calls a function of the interface logic 158 to request initiation of a transaction through ACH processing service computer 112. In response, interface logic 158 modifies or reformats the message as appropriate for compatibility with the ACH processing service computer 112 and dispatches a message to that computer. Transactions may be dispatched in batches; for example, all transactions for which customers entered data in a particular business day may be dispatched at a specified time after the close of business for that day.

The transaction initiation logic 152 further updates, in the transaction repository 159, records associated with the transactions to indicate that the transactions were initiated. Updating may include marking with timestamps to facilitate tracking the end of regulatory waiting periods that are required before funds can be released to payees such as payee 104.

In step 207, the process enters a waiting period proscribed by banking regulations during which the payment service may not release funds to the payee 104 or other payees represented in the transactions, to enable ACH operator computer 130 and/or the payer's bank 120 to report that the payer has insufficient funds or uncollected funds associated with an account or transaction.

In step 208, at the end of the waiting period, the process marks, in the transaction repository, the associated waiting transactions as having been accepted. Thus, once the regulatory waiting period ends for a particular set of transactions, data records in the repository may be marked as accepted. In step 210, funds associated with the transactions may be released to payees.

During the waiting period shown at step 207, payer's bank 120 receives transaction data for one or more transactions that identify payer's bank by a financial institution routing number. In this context, the term "financial institution routing number" refers to any value that uniquely identifies a financial institution for purposes of messages or transactions in financial payment and transaction networks, and includes as examples American Bankers Association (ABA) bank routing number, bank deposit sort code, and functionally equivalent identifiers used in countries other than the United States.

The payer's bank 120 may determine that one or more transactions cannot be honored or paid because the payer's account has insufficient funds. Additionally or alternatively, the ACH operator computer 130 or ACH processing server 112 may determine that funds are uncollectible from the payer's bank or another institution involved in the transaction, for example, because an account number in a transaction is invalid. In these cases, the ACH operator computer 130 or ACH processing server 112 may generate a negative return code, attach the return code to transaction identifying data, and send a message containing the data and code to the payment management service. The transaction identifying data includes a routing number or other unique identifying number for the financial institution that caused generating the negative return code. Example return codes include R01 indicating NSF or insufficient funds and R09 indicating uncollected funds. Codes R01 and R09 are collectively termed negative return codes herein.

The ACH operator computer 130 or ACH processing server 112 never return positive return codes or other return codes indicating successfully processed transactions; return codes are provided only for NSF, uncollectable, or other negative transactions.

Accordingly, at step 212 the process may receive one or more negative return codes for one or more particular transactions that are associated with a particular financial institution routing number. Receiving may involve payment management service computer 106 polling database tables held at financial institutions or at the ACH processing service computer 112 and determining whether columns include negative return codes. Once the negative return codes are received, receiving additional negative return codes for other transactions associated with the same financial institution routing number is extremely unlikely because the institution is highly likely to have processed all transactions at the time that it first reports negative return codes for one or more transactions in a batch or plurality. The foregoing holds true for transactions in the batch associated with a current day and for all batches associated with each previous day.

Therefore, when step 212 occurs, the process assumes that the particular financial institution associated with the routing number or other identifier has completed reviewing and processing all other transactions that were submitted in the same batch or for the same day. Therefore, all other transactions not specifically identified as having a negative return code and received at step 212 are deemed acceptable.

In response, at step 214, without waiting for the end of the proscribed regulatory waiting period, the process marks, in the transaction repository, all other transactions associated with the same financial institution routing number as accepted. Thus, for those other transactions, the normally required waiting period is bypassed as indicated at block 220. The process then immediately releases the marked transactions, for example, by paying the payee. Step 214 may be triggered by receiving at step 212 only one transaction that has a negative return code and that is associated with a particular financial institution routing number, or by receiving multiple transactions that all have one of the negative return codes and are all associated with the same particular financial institution routing number. In either case, step 214 operates to mark all other transactions associated with the same particular financial institution routing number without waiting for the end of the regulatory waiting period.

As a clarification, the transactions marked at step 214 may be and typically are associated with a completely different bank account owner or customer than the particular transaction for which a negative return code was received at step 212. Thus, in the present process, potentially thousands of users who have submitted transactions for bank accounts held at a particular financial institution, which is identified by the same routing number as the particular transaction having the negative return code, will have their transactions marked, released and completed far earlier than in conventional practice.

In parallel, rejection processing is performed for the particular transaction for which a negative return code was received at step 212. For example, the process generates and causes sending an e-mail message to the user who entered data for the particular transaction, and the e-mail message states that an NSF or non-collection error occurred, and that the transaction cannot complete.

In one embodiment, step 214 further comprises marking all transactions in one or more first batches associated with one or more previous days and having the same particular financial institution routing number, in response to receiving a negative return code for at least one transaction in a second batch associated with the current day and the same particular financial institution routing number. Thus, if the regulatory waiting period has not yet expired for transactions or batches associated with one or more previous days, but at least one negative return code is received for a particular transaction in the a batch or transactions for a current day, then the process assumes that the financial institution that generated the negative return code has already reviewed and processed all batches and all transactions for all previous days. Experiments have observed that financial institutions use strict serial transaction processing, thus processing transactions strictly in date-time order so that transactions for a current day are never processed before transactions for a previous day. The alternative embodiment allows release of funds for even more transactions, improving efficiency and speed.

In one embodiment, step 206 or another step performed at about the same time may comprise inserting, into each batch of transactions that are submitted or initiated as part of step 206, data for a dummy transaction that contains a valid financial institution routing number, but an account number or other values known to be invalid, for the purpose of triggering a financial institution to respond with a negative response code. In this approach, the dummy transaction ensures that the process or the payment management service computer 106 is alerted at the earliest possible time that a financial institution has processed the associated batch of transactions, by causing the financial institution to generate and send at least one return code for each batch of transactions. The return code caused by the dummy transaction would be received at step 212 and the process would continue as described for steps 214, 216, 218, 220.

As a result of the preceding process, large numbers of acceptable transactions are marked and released far earlier than with conventional processes, which require waiting out the entire regulatory waiting period for all transactions. For example, instead of waiting five business (5) days for clearance and completion, a user might experience starting and completing a transaction in one business (1) day or less, depending on how rapidly financial institutions process batches of transactions. Such a shortened waiting period may be very significant to certain users. For example, it is possible that the payment management service computer 106 will initiate a funds transfer transaction from the payer's bank 120 to the payment management service, which completes successfully resulting movement of money from the payer to the service. However, the service is still required to wait the entire four (4) business day regulatory period in the event that a negative return code might be received. During this time, the payer has paid money but the money is not in the hands of the payee, which may cause distress or annoyance to the payer. Thus, if the waiting period can be shortened, the negative experience of the payer is mitigated. In experiments it has been found that about 97% of return codes are received within the first three (3) business days after submitting a batch. Therefore, large numbers of users of a funds transfer service can experience a shorter time between creating a transaction and successfully delivering money to a payee; consequently, user satisfaction increases.

Another result is a service associated with the payment management service computer 106 may have an improved ability to estimate risk associated with in-process transactions, by determining earlier in the transaction clearing process that particular transactions are negative and others are positive. For example, the service may maintain records of aggregate risk measured as a sum or portion of in-process transactions and the records can be updated more rapidly and to indicate less risk when a large number of acceptable transactions are cleared more rapidly with the techniques herein.

Yet another result is that the payment management computer 106 operates differently and more efficiently than prior computers. Because the system is configured to release large numbers of transactions far earlier than suggested by the regulatory scheme, the computer 106 can operate more efficiently, use less memory or non-volatile storage for storing data related to in-process transactions that are waiting for release, and achieve higher transaction throughput.

In an embodiment, the process of FIG. 2 may be integrated into or used as one process step within a larger risk management process of the payment management service. For example, the payment management service may implement a multi-step risk model that assesses risk of each particular transaction and determines whether to expedite a particular transaction by clearing it in less than the conventional four (4) day regulatory waiting period. For example, various fraud risk modeling processes may be applied to transactions and may determine that particular transactions represent a low risk of fraudulent activity based on factors such as customer history, destination or originating bank or country, and cross-correlation of customer data with other sources of customer information. When the fraud risk modeling processes indicate low risk, then a transaction may be expedited without using the processes herein and may even complete immediately. When a transaction cannot be expedited based on the fraud risk modeling processes, then the transaction may be expedited using the processes herein by maintaining the transaction in an unreleased batch and marking the transaction for release in response to receiving a negative return code for another transaction in the same batch and having the same financial institution routing number.

Figure 3:
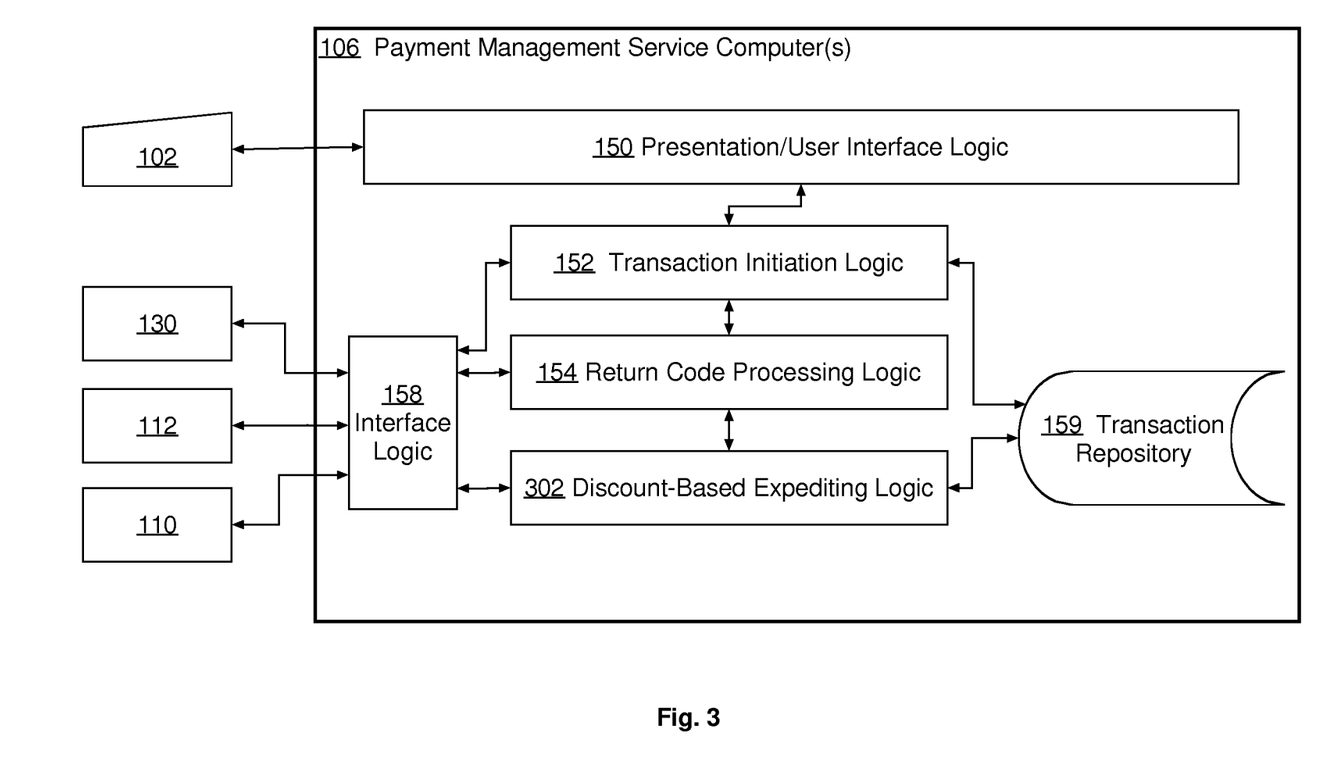
FIG. 3 illustrates second example internal logic of the payment management service computer of FIG. 1A.
Figure 4:
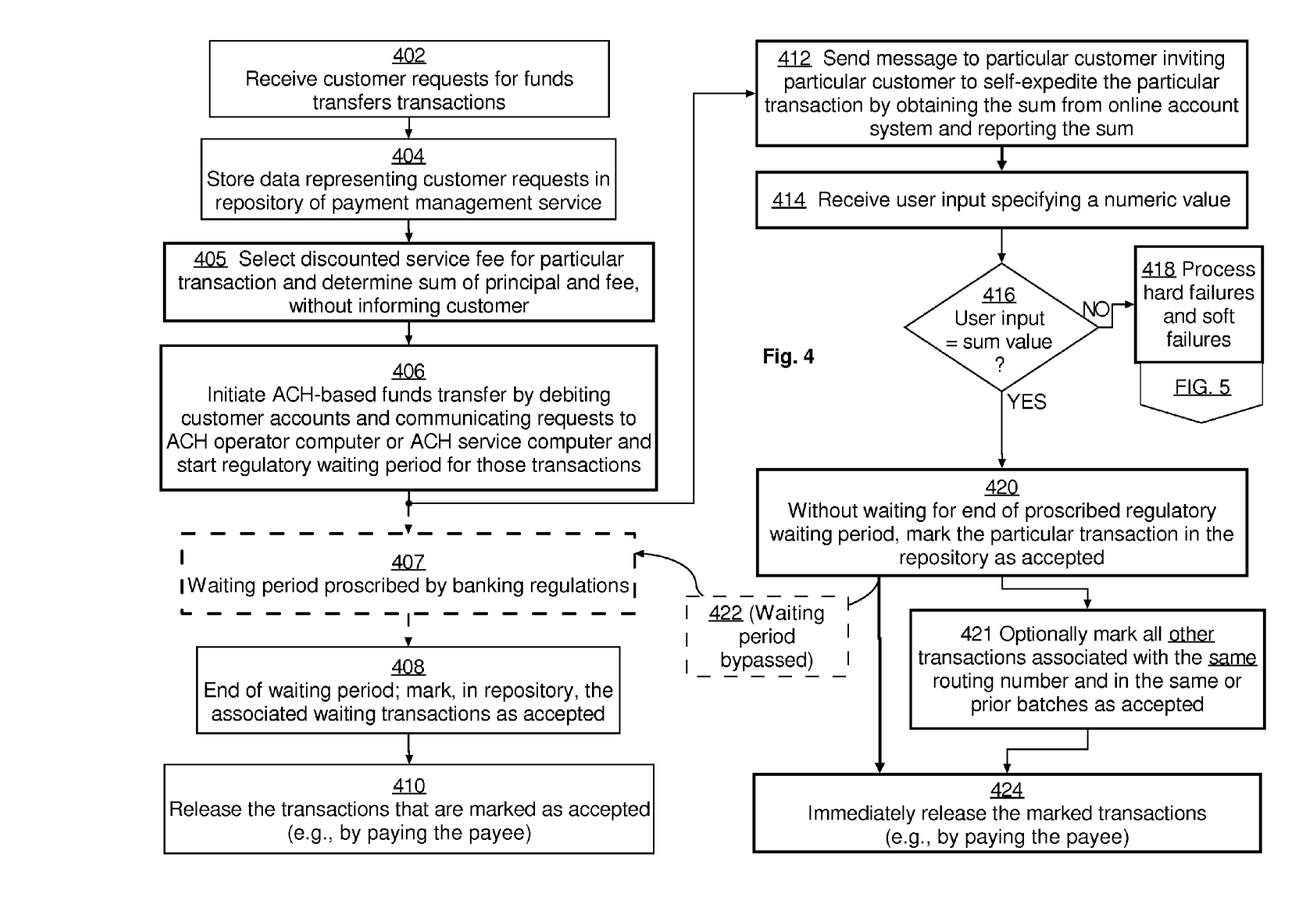
FIG. 4 illustrates a discount-based self expedite process.
Figure 5:
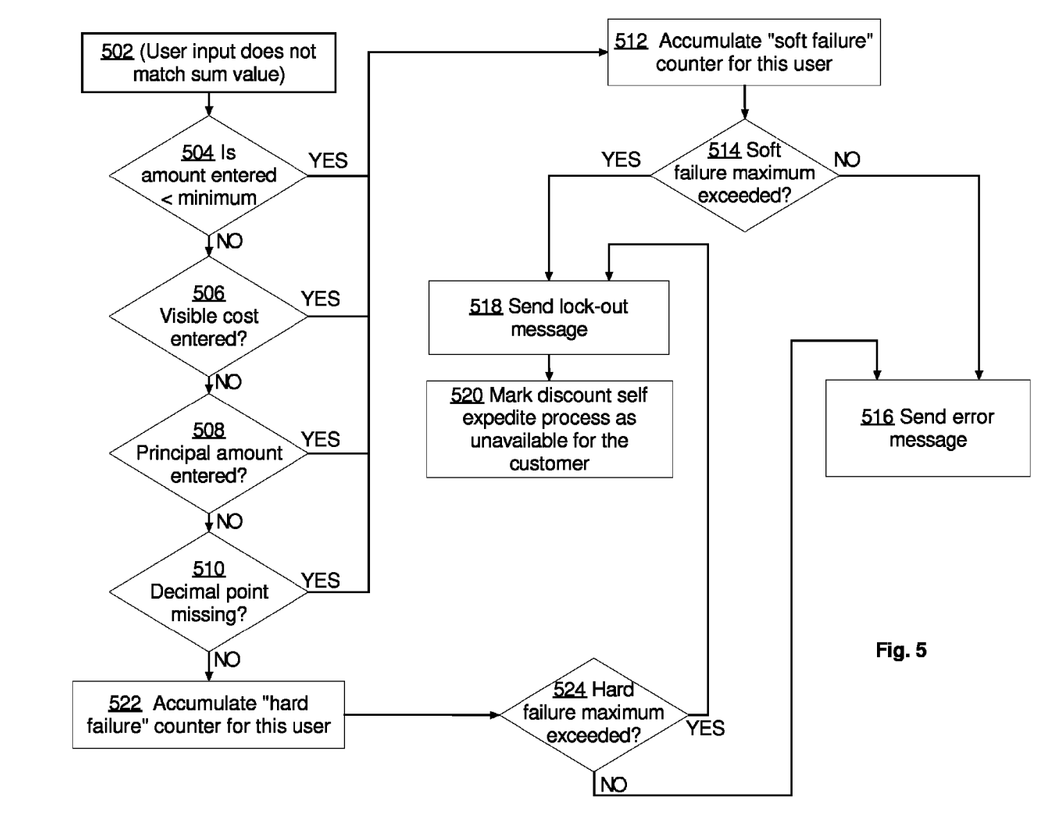
FIG. 5 illustrates processing hard failures and soft failures.

3. Expediting Electronic Funds Transfer Transactions Based on "Invisible" Discounts 3.1 Overview FIG. 3 illustrates second example internal logic of the payment management service computer of FIG. 1A; FIG. 4 illustrates a discount-based self expedite process; FIG. 5 illustrates processing hard failures and soft failures. Referring first to FIG. 3, in an embodiment, payment management service computer 106 comprises discount-based expediting logic 302, which is configured to enable users or customers of a funds transfer service to self-expedite transactions by providing the service with evidence of ownership of a valid account.

In general, embodiments using discount-based expediting logic 302 enable users to expedite money transfer transactions that are funded by electronic funds transfers cleared through ACH systems, that are not expedited by fraud models of the service provider, and that are not expedited by the delayed expedite process described herein in connection with FIG. 2. To obtain expedited release of a transaction, a user may provide the service with a signal that the service is not likely to receive a negative return code for the transaction through the following general process.

In an embodiment, a user of payer computer 102 initiates a funds transfer transaction that will be performed by debiting the user's account at the payer's bank 120 for a principal amount plus a service fee, and then paying the principal amount to the payee 104 through payee's bank 110 or the partner organizations 108. The user provides transaction data including bank account information for the payer's bank account. Payment management service computer 106 informs the user of the amount of the service fee that will be charged to perform the transaction.

The discount-based expediting logic 302 is configured to grant the user a small discount in transaction service fees, without informing the user about the exact amount of the discount. The amount of the discount is typically less than $1, and may be a randomly generated or weighted random value. The service debits, from the user's account at payer's bank 120, a sum of the principal amount of the money transfer transaction and the discounted service fee. The service does not inform the user of the sum that was debited. The service prompts the user to determine the sum, for example, by requesting the user to log in to an online banking facility and to determine the sum by reviewing the user's statement data in the online banking facility.

In an embodiment, the prompting may occur on a first communication channel 170 that links the payer computer 102 and the payment management service computer 106, but the user determines the sum by connecting to an online banking facility at the payer's bank 120 over another communication channel 160 that links the payer computer and the payer's bank or an affiliated site. Channels 160, 170 may represent a browser connecting to different URLs or websites; thus the user obtains the sum at one online location, such as the online banking facility of the user's bank, and provides the sum to the service at a different online location.

Online banking facilities are normally subject to security restrictions, often involving a secure registration procedure and creation of a personal identifier, password or site key. Therefore, if the user is capable of logging into the online banking facility and correctly reporting the debited sum to the service, then the service may have confidence that a negative return code will not be received for the transaction. In particular, if the user can provide the correct debited sum value, then the payment management service computer 106 can determine the user's account is valid, and that the user has control of the account; this information cannot be determined through conventional fraud models. The payment management service computer 106 also can determine that the service will not receive an invalid account code as a negative return code through the ACH clearing system.

In an embodiment, when the user contacts the service and provides the correct sum value reflecting the randomly selected service fee discount amount, then the service may immediately release a previously held transaction, resulting in expediting the transfer of money to the payee.

Typically the discount-based self expediting process herein is applied to transactions that have not been expedited through other means such as the application of fraud models in the service or the use of the delayed expedite process described in section 2.

The payment management service computer 106 may inform the payer computer 102 about the availability of a discount-based self expediting process in several ways. In one embodiment, the payment management service computer 106 generates and causes sending an e-mail message to the payer computer 102, or to an e-mail box associated with a user account held at the payment management service computer or as part of the service, that prompts user to inform the service of the exact sum amount that the service withdrew from the user's account. In another embodiment, if the user is displaying a list of pending transactions by interacting with the presentation/user interface logic 150, the payment management service computer 106 causes displaying an icon, button, or other user interface widget that prompts the user to expedite the transaction. In an embodiment, an icon relating to discount-based self expediting is displayed next to each transaction that is in a state of waiting for release.

Referring now to FIG. 4, in an embodiment, the following discount-based self expediting process may be performed. In an embodiment, discount-based expediting logic 302 is configured to implement FIG. 4, FIG. 5.

Operations 402, 404 correspond to operations 202, 204 of FIG. 2 and may be implemented in the same manner as described for FIG. 2. Operation 405 may be reached in the process flow after one or more fraud models are applied to the transactions and after a determination about whether the delayed expedite process of FIG. 2 may be applied to the transactions. If these operations cannot be used to expedite one or more of those transactions, then particular transactions may be processed as described for operations 412 to 424 of FIG. 4. In operation 405, the process selects a discounted service fee for a particular transaction and determines a sum of a principal amount of the transaction and the discounted service fee, without informing the customer who initiated the transaction about the sum or the discounted service fee. The sum and/or the discounted service are stored securely in transaction repository 159 and not reported to the payer or payee.

In an embodiment, to control a loss rate that may be inherent in the process, a weighted discounted service fee is selected at operation 405. In an operation, the amount of discount off the regular service fee ranges from 0.1 cents to 99 cents and the process makes a weighted random selection between the values representing the endpoints of the range. Thus, the discount-based expediting logic 302 can customize the weighting such that the average discount applied to a transaction is a certain amount; for example, a relatively low amount of discount may be chosen for every particular transaction, while retaining enough randomness to prevent users from guessing the discounted amount.

Operation 406 generally corresponds to operation 206 of FIG. 2, and results in debiting customer accounts for the principal amounts of transactions plus the service fees applicable to the transactions. For a particular transaction, the customer account is debited in an amount equal to the sum of the principal amount and the discounted service fee. Debiting occurs through electronic funds transfer via the ACH network and the debit amount is not reported directly to the customer.

Operations 407, 408, 410 generally correspond to operations 207, 208, 210 of FIG. 2 and may be implemented in the manner described for FIG. 2.

At operation 412, the process sends a message to a particular customer inviting the particular customer to self-expedite a particular transaction by obtaining the sum value from an online account system and reporting the sum. Operation 412 may involve generating and causing sending an e-mail message, marking transactions listed in a user interface, or other techniques for informing a user that expediting is available.

In operation 414, the process receives user input specifying a numeric value. In an embodiment, operation 414 typically occurs in response to a user logging into the user's online banking account system, viewing a statement of past transactions, viewing and identifying the sum value, then separately entering the sum value in an HTML form or other user interface element that is provided by the payment management service computer 106.

In operation 416, the process tests whether the numeric value provided in the user input is equal to the sum value that was determined and stored at step 405. If the user provides a value that does not match the stored sum value, then operation 418 may be used to determine whether the user input represents one of several categories of common user failures, and to respond appropriately. Operation 418 may be implemented as shown in FIG. 5, which is described further herein.

If the result of operation 416 is positive, then in operation 420, without waiting for the end of the proscribed regulatory waiting period of operation 407, the process marks the particular transaction as accepted.

In step 424, the process immediately releases the marked transaction as described above for operation 218 of FIG. 2.

3.2 Processing Soft Failures and Hard Failures

As a security measure, in certain embodiments the user is only permitted to use the self expediting feature and provide an incorrect sum value for a maximum of a specified number of times before the service prevents further use. Therefore, a user cannot defeat the process by sending a large number of small-value, fraudulent transfers and guessing the sum or invisible discount amount to cause some transfers to succeed. As a general overview, in one embodiment, if a user makes two failed attempts for the same particular transfer, then the self-expediting invisible discount process is disabled for that transfer and the user is required to wait for the normal clearance and release process to complete. In one embodiment, if the user makes five consecutive failed attempts over multiple transfers, then the self-expediting invisible discount process is disabled for that user for all present and future transfers.

In an embodiment, the process implements a plurality of tests for conditions denoted as "hard user failures" and "soft user failures." The process distinguishes between hard user failures and soft user failures to account for potential user confusion that might arise from the fact that the discounted service fee is an amount different than the service fee initially provided to the user by the service for a particular transaction. Other user error may arise from the user entering a value consisting of the difference between a sum of the principal amount and the service fee that was initially provided, and the amount that was actually debited from the user's account. For example, if the principal amount for a money transfer transaction is $500, and the service initially informs the user that the service fee is $15, but the service actually debits $514.88 from the user's account representing a hidden discount of $0.12, the user might erroneously enter $515 or $0.12 in response to a system prompt rather than $514.88.

Accordingly, in an embodiment, if the user enters the discount amount (for example, $0.12 in the preceding example) rather than the sum of the discounted fee and the money transfer amount ($514.88 in the example), such an error is classified as a soft user failure and is not counted as a hard failure that eventually can result in the service declining to offer invisible discount self expediting to the user.

Similarly, if the user responds by entering the sum of the money transfer amount and the originally stated service fee ($515 in the above example), the service also treats such user error as a soft user failure. In various embodiments, any one or more of the following may be treated as a soft user failure: receiving user data input specifying the money transfer principal amount ($500 in the above example); receiving user data input specifying a foreign currency amount when the money transfer is a foreign country funds transfer; receiving user data input specifying the correct numerical digits but omitting a decimal point ("51488" for the above example). In the latter case, the user input is equal to a product of 100 and the principal amount.

Referring now to FIG. 5, processing such soft user failures and hard user failures as part of operation 418 is described. Operation 502 is reached when the test of operation 416 (FIG. 4) is negative. In operation 504, the process tests whether the user entered an amount that is less than a minimum allowed amount for a money transfer. In an embodiment, payment management service computer 106 enforces a minimum transaction amount of $25 including service fee, and a maximum discount of $0.99 from the service fee. Therefore, if a user enters a value less than $24, then a soft user failure is deemed to occur.

In operation 506, the process tests whether the user entered a visible cost amount, which is the total cost that the user thinks the user is being charged. The visible cost is equal to a sum of the principal and the service fee that the service originally disclosed to the user. In operation 508, the process tests whether the user entered the principal amount of the transaction. In operation 510, the process tests whether the user entered the correct sum amount, but without a decimal point such that the user input divided by 100 equals the correct sum amount.

If any of operations 504, 506, 508, 510 is positive, then control transfers to operation 512 in which the process accumulates a soft failure counter for the user who initiated the transaction. The soft failure counter tracks, for a particular user, the number of soft user failures that the particular user caused. In operation 514, the process tests whether a specified maximum threshold number of soft failures has been exceeded. The maximum number may be configurable and may be obtained from user input, from a configuration file, or through other means. If the maximum number is not exceeded, then at operation 516 the process generates and causes sending an error message or other informative message to the user. The content of the message may vary in different embodiments; example messages may inform the user or customer about the nature of the error, or inform the user that some error occurred and invite the user to provide replacement user input, or report the number of soft user failures that have been counted and the consequences of exceeding the threshold value, or any combination of the foregoing. The message may be an electronic document that generally identifies the failure and invites the user to submit new data. For example, an HTML page may be generated and delivered to the payer computer and containing the message, "The value you entered isn't quite right. Please try again."

Thus, at operation 516 the soft user failure has been recognized and counted, but the user may be permitted to try again to provide correct information. In some embodiments, operation 516 may also involve writing to a log file, notifying an administrator, or taking other responsive action.

If the soft user failure maximum threshold number is exceeded, then optionally, in operation 518 the process may generate and cause sending a lock-out message, and may mark the discount self expedite process as unavailable for the customer or user as shown in operation 520. In various embodiments, operations 518, 520 may involve making the discount based self expedite process unavailable, with or without sending a message to the user. Thus, in response to a soft user failure, the system may silently make the process unavailable without informing the user, so that the user is simply required to wait until the transaction is released at the end of the recommended regulatory waiting period or until a release occurs through other means, such as delayed expediting. In various embodiments, operations 518, 520 may involve making the discount based self expedite process unavailable for the current transaction, or for the current transaction and all other transactions of the current user, in perpetuity or for a specified time period. Making the process unavailable for one or more transactions may involve marking a state, attribute, or other metadata value for one or more transactions in the repository 159.

The particular responsive action performed at operations 518, 520 may depend on the value of the soft failure maximum threshold number. Typical values might be "2," "5," "20," or any other value that is deemed to be suitable according to policy or risk tolerance principles of the service provider. Further, in various embodiments, multiple soft failure thresholds may be maintained and the action taken at operations 518, 520 may vary depending on which threshold is exceeded. For example, exceeding a threshold of "2" soft user failures might result in making the discount based self expedite process unavailable for the current particular transaction, and exceeding a threshold of "5" might result in making the process unavailable for the current particular transaction and all other transactions initiated by the same user or customer.

The process reaches operation 522 when all tests of operations 504, 506, 508, 510 are negative, so that the non-matching user input identified at operation 502 does not correspond to any soft user failure condition and is categorized as a hard user failure. For example, the user input may represent a value that bears no relationship to the principal amount, the visible cost, or the expected sum value. User input not matching these conditions may represent a security attack. Therefore, in an embodiment, a separate counter of user hard failures is maintained and accumulated at operation 522.

At operation 524, the process tests whether a separate hard failure maximum threshold number is exceeded. If not, then optionally at operation 516 the process causes generating and sending a corrective message to the user or customer. Thus, in response to a hard user failure, the system may silently make the process unavailable without informing the user, so that the user is simply required to wait until the transaction is released at the end of the recommended regulatory waiting period or until a release occurs through other means, such as delayed expediting. As previously described for operation 516 following operation 514, in various embodiments the content of the message may vary in different embodiments; example messages may inform the user or customer about the nature of the error, or inform the user that some error occurred and invite the user to provide replacement user input, or report the number of soft user failures that have been counted and the consequences of exceeding the threshold value, or any combination of the foregoing. Further, operation 516 may also involve writing to a log file, notifying an administrator, or taking other responsive action.

If the hard failure maximum threshold value is exceeded, then control proceeds from operation 524 to operations 518, 520. As with soft failures, operation 518 is optional. Thus, in response to a hard user failure, the system may silently make the process unavailable without informing the user, so that the user is simply required to wait until the transaction is released at the end of the recommended regulatory waiting period or until a release occurs through other means, such as delayed expediting. Further, operations 518, 520 may proceed after operation 524 in the same manner described above for operation 514; for example, multiple configurable hard failure threshold values may be used with multiple different response approaches.

In an embodiment, administrative action at the service provider may be used to reset users whose accounts have been marked such that the invisible discount self expediting process has become unavailable. Thus, in some instances an innocent user may be able to contact a customer service representative of the service or invoke a customer service function and cause the user's account to be reset so that the invisible discount self expediting process again becomes available. In an embodiment, a reset may be automatically applied under certain circumstances. For example, if a user causes one or more failures but then succeeds on a subsequent attempt and thus does not cause five consecutive failures, then the number of possible failure attempts is reset to five.

3.3 Optional Delay after Receiving Correct Input

In some embodiments the process or payment management service computer 106 assumes that the payer's bank 120 has processed all transactions in the same batch or previous batches having the same financial institution routing number for that bank by the time that the user successfully enters the sum value at operation 416. Consequently, in some embodiments the process may respond by applying the delayed expedite process described above to all other customers who have transactions in the same batch or previous batches with the same financial institution routing number. Such a response may be applied not to customers associated with different banks or different financial institution routing numbers who may be in the same batch or previous batches, only to those with the same routing number as the customer who successfully entered an invisible discount response.

In some embodiments, the payer's bank 120 may process customer account debits and generate negative return codes at different times. Accordingly, in some embodiments a configurable delay period is observed between receiving a successful entry of an invisible discount and then releasing transactions of all other customers in the same batch or previous batches and having the same financial institution routing number. The configurable delay period ensures that the bank has processed all transactions and generated any negative return codes before the service releases the other transactions.

In an embodiment, optionally, at operation 421, the process may mark all other transactions that are associated with the same financial institution routing number as the particular transaction for which a user successfully provided the sum value, and that were in the same batch as that particular transaction or any previously communicated batch. The option of operation 421 is based upon the policy recognition that if the user can provide the correct sum from the user's online bank account, then the bank must have already completed processing the transaction and all other transactions in the same batch.

In an embodiment, the service imposes a configurable delay, of a particular time, between a time at which the service receives correct user input of the sum of the money transfer amount and the discounted fee (FIG. 4, operation 416, YES path or result), and a time at which the service releases the transaction (FIG. 4, operation 420, 421, 422, 424). In an embodiment, the particular time may be determined as a difference between the time at which the service receives the correct user input and a known time at which return code files for the particular bank can be accessed or are received. Alternatively, the particular time may be determined as a fixed time period, or as a difference between the time at which the service receives the correct user input and a particular time of day, or a particular time of the next day, or a time at which the next return code file is received or obtained from the particular bank. For example, the service might always wait until 5:30 AM of the next business day after the user input is received, based on business knowledge that the return code file is received or becomes available for retrieval by 5:30 AM each business day. The use of the configurable delay is not required.

3.4 Selective Offering of Discount Based Self Expediting

In an embodiment, the availability of the process of FIG. 4 is assigned randomly to users or to a percentage of users of the service provided by payment management service computer 106. For example, in one embodiment the self-expediting invisible discount process herein is offered to 100% of users who do not receive expediting through the application of fraud models or through the delayed expedited process described elsewhere in this disclosure. In another embodiment, the process is offered to fewer than 100% of all users in response to the service determining that the process has been subject to improper use.

In an embodiment, the availability of the discount based self expediting process or the delayed expedite process described in the preceding section may be based, for a particular user, upon account validity information obtained from a third party data provider. For example, in an embodiment, user account data is provided over a secure communication channel to a verification service that can determine through a private database whether the account information is known to be associated with a valid account. An example of a third party data verification service is ACH Direct. For example, in an embodiment, user account data is provided to the data verification service, which returns a score value or particular return values that indicate information about the status of the account. Based on the score value or the return values, the service may elect whether to make one or more of the expediting techniques herein available to a particular user.

Additionally or alternatively, the service may elect whether to make expediting techniques available based on past transaction history of the customer with the service.

The application of the foregoing rules and principles may be implemented in a manner that is transparent to the customer so that the customer is unaware that the service has determined whether the techniques should be made available to that customer or not.

4. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
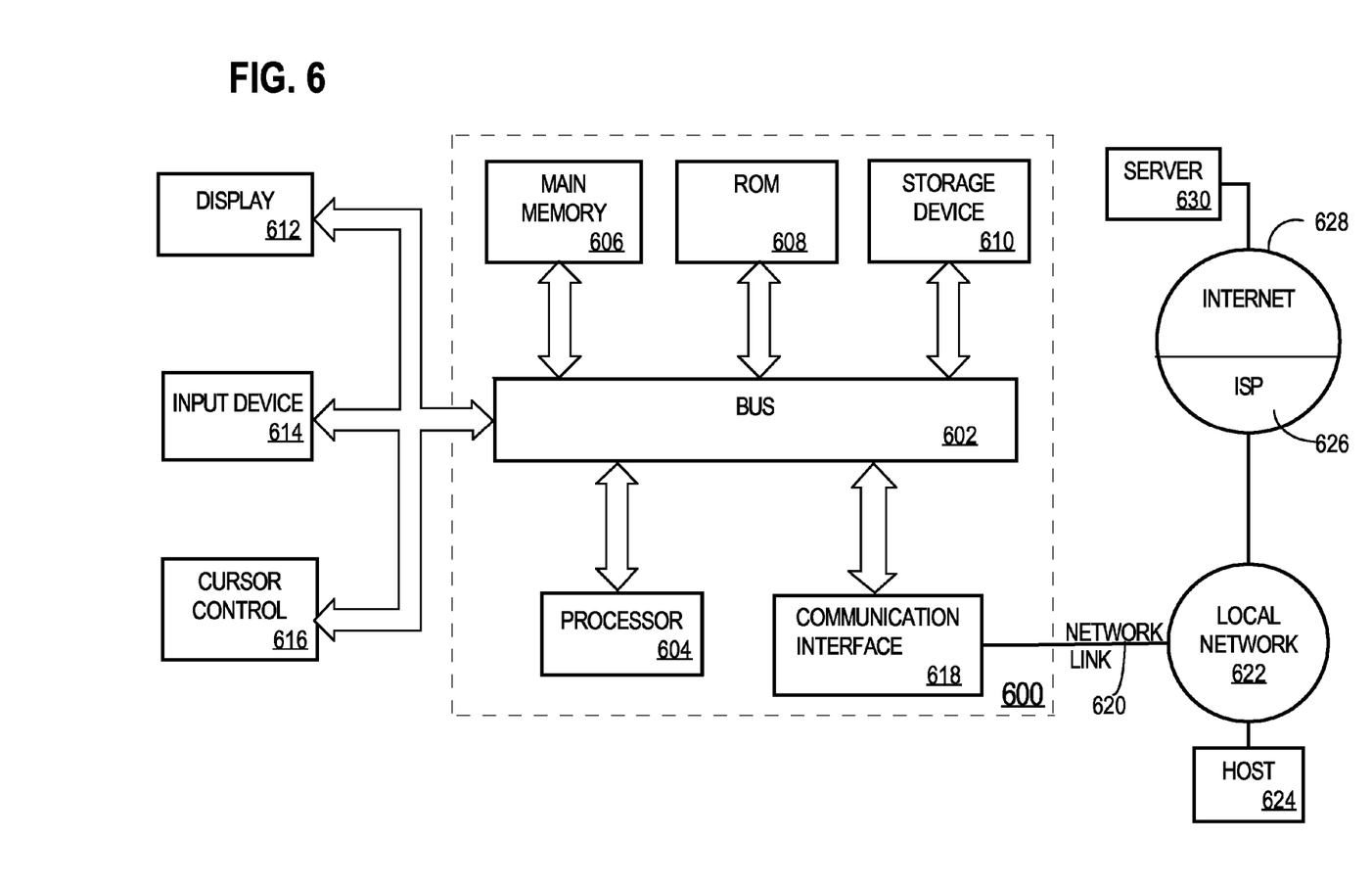
FIG. 6 illustrates a computer system that may be used to implement particular computers of FIG. 1 or to execute the process of FIG. 2.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

initiating a plurality of electronic funds transfer transactions using an automated clearing house (ACH) operator, wherein each of the plurality of electronic funds transfer transactions is associated with one of a plurality of financial institution routing numbers;

storing time data that indicates a period to wait before marking any of the plurality of electronic funds transfer transactions as accepted;

after storing the time data, receiving, using a payment management service computer that is different than the ACH operator, from the ACH operator or a processing server associated with the ACH operator, a negative return code for a particular transaction that is associated with a particular financial institution routing number;

wherein the negative return code indicates that the particular transaction is associated with insufficient funds or is associated with uncollected funds or is another form of negative transaction;

in response to receiving, using the payment management service computer, from the ACH operator or the processing server associated with the ACH operator, the negative return code for the particular transaction that is associated with the particular financial institution routing number and without waiting for an end of the period of the time data:
  identifying, using the payment management service computer, one or more other transactions, in the plurality of electronic funds transfer transactions, that are associated with the same particular financial institution routing number;
  marking the one or more other transactions as accepted;
  releasing the marked one or more other transactions;
  wherein the marking and releasing are performed by one or more computing devices.

2. The method of claim 1 wherein the negative return code indicates that the particular transaction is associated with insufficient funds or is associated with uncollected funds.

3. The method of claim 1, wherein the marking comprises marking as accepted all other transactions that are associated with the same particular financial institution routing number and that were submitted in a same batch.

4. The method of claim 1, wherein the marking comprises marking as accepted all other transactions that are associated with the same particular financial institution routing number and that were in a batch submitted on any preceding day.

5. The method of claim 1, wherein the marking comprises marking as accepted all other transactions that are associated with the same particular financial institution routing number and that were in a first batch initiated on a same day and also marking as accepted all other transactions that are associated with the same particular financial institution routing number and that were initiated in one or more second batches on any of one or more preceding days.

6. The method of claim 1 wherein the plurality of electronic funds transfer transactions are foreign country funds transfer transactions.

7. The method of claim 1 wherein the ACH operator is any of a Federal Reserve Bank of the United States, Electronic Payments Network (EPN), a Pan-European Automated Clearing House (PE-ACH), or EBA Clearing Company.

8. The method of claim 1, wherein the initiating comprises providing data describing the plurality of electronic funds transfer transactions to an ACH payment processor.

9. The method of claim 1, wherein the particular financial institution routing number comprises an American Bankers Association (ABA) bank routing number or an international ACH financial institution identifier number.

10. The method of claim 1, wherein the particular financial institution routing number comprises a bank deposit sort code.

11. The method of claim 1, further comprising, prior to receiving the negative return code, inserting, into the plurality of electronic funds transfer transactions, data for a dummy transaction that contains a valid financial institution routing number and one or more invalid values.

12. The method of claim 1, wherein marking and releasing are performed only for transactions that are not released based on applying one or more transaction fraud screening processes to the plurality of electronic funds transfer transactions.

13. One or more non-transitory computer-readable media storing instructions which, when executed by one or more processors, cause:
  initiating a plurality of electronic funds transfer transactions using an automated clearing house (ACH) operator, wherein each of the plurality of electronic funds transfer transactions is associated with one of a plurality of financial institution routing numbers;
  storing time data that indicates a period to wait before marking any of the plurality of electronic funds transfer transactions as accepted;
  after storing the time data, receiving, using a payment management service computer that is different than the ACH operator, from the ACH operator or a processing server associated with the ACH operator, a negative return code for a particular transaction that is associated with a particular financial institution routing number;
  wherein the negative return code indicates that the particular transaction is associated with insufficient funds or is associated with uncollected funds or is another form of negative transaction;
  in response to receiving, using the payment management service computer, from the ACH operator or the processing server associated with the ACH operator, the negative return code for the particular transaction that is associated with the particular financial institution routing number, and without waiting for an end of the period of the time data:
    identifying, using the payment management service computer, one or more other transactions, in the plurality of electronic funds transfer transactions, that are associated with the same particular financial institution routing number;
  marking the one or more other transactions as accepted;
  releasing the marked one or more other transactions.

14. The one or more non-transitory computer-readable media of claim 13, wherein the negative return code indicates that the particular transaction is associated with insufficient funds or is associated with uncollected funds.

15. The one or more non-transitory computer-readable media of claim 13, wherein marking comprises marking, as accepted, all other transactions that are associated with the same particular financial institution routing number and that were in a batch submitted on in a same batch.

16. The one or more non-transitory computer-readable media of claim 13, wherein marking comprises marking as accepted all other transactions that are associated with the same particular financial institution routing number and that were in a batch submitted on any preceding day.

17. The one or more non-transitory computer-readable media of claim 13, wherein marking comprises marking, as accepted, all other transactions that are associated with the same particular financial institution routing number and that were in a first batch initiated on a same day and also marking as accepted all other transactions that are associated with the same particular financial institution routing number and that were initiated in one or more second batches on any of one or more preceding days.

18. The one or more non-transitory computer-readable media of claim 13, wherein the plurality of electronic funds transfer transactions are foreign country funds transfer transactions.

19. The one or more non-transitory computer-readable media of claim 13, wherein the ACH operator is any of a Federal Reserve Bank of the United States, Electronic Payments Network (EPN), a Pan-European Automated Clearing House (PE-ACH), or EBA Clearing Company.

20. The one or more non-transitory computer-readable media of claim 13, wherein initiating comprises providing data describing the plurality electronic funds transfer transactions to an ACH payment processor.

21. The one or more non-transitory computer-readable media of claim 13, wherein the particular financial institution routing number comprises an American Bankers Association (ABA) bank routing number or an international ACH financial institution identifier number.

22. The one or more non-transitory computer-readable media of claim 13, wherein the particular financial institution routing number comprises a bank deposit sort code.

23. The one or more non-transitory computer-readable media of claim 13, wherein the instructions, when executed by the one or more processors, further inserting, into the plurality of electronic funds transfer transactions that are initiated in the initiating step, data for a dummy transaction that contains a valid financial institution routing number and one or more invalid account number or other values.

24. The one or more non-transitory computer-readable media of claim 13, wherein marking and releasing are performed only for transactions that are not released based on applying one or more transaction fraud screening processes to the plurality of electronic funds transfer transactions.

\* \* \* \* \*